United States Patent [19]

Thomas

[11] Patent Number: 4,926,767

[45] Date of Patent: May 22, 1990

[54] NO-TILL DRILL PROVIDING SEED AND FERTILIZER SEPARATION

[76] Inventor: J. W. Thomas, HC 11 Box 140, Prescott, Wash. 99348

[21] Appl. No.: 261,352

[22] Filed: Oct. 24, 1988

[51] Int. Cl.$^5$ .............................................. A01C 5/08
[52] U.S. Cl. .................................... 111/187; 111/156; 111/123; 111/194
[58] Field of Search ................... 111/7, 73, 80, 85, 84, 111/86, 190–197, 926, 136, 137, 120, 121, 151; 172/538

[56] References Cited

U.S. PATENT DOCUMENTS

| | | | |
|---|---|---|---|
| 488,072 | 12/1892 | Howard | 111/85 |
| 1,020,681 | 3/1912 | Binns | 111/85 |
| 1,905,767 | 4/1933 | Traphagen | 111/73 |
| 1,906,351 | 5/1933 | White | 111/73 |
| 1,908,255 | 5/1933 | Kaupke | 111/73 |
| 1,951,003 | 3/1934 | White | 111/73 |
| 2,164,066 | 6/1939 | Halle | 111/73 |
| 2,889,788 | 6/1959 | Van Dorn | 111/80 |
| 3,854,429 | 12/1974 | Blair | 111/7 |
| 4,276,836 | 7/1981 | Pust | 111/86 |
| 4,417,530 | 11/1983 | Kopecky | 111/73 |
| 4,565,141 | 1/1986 | Kopecky | 111/7 |
| 4,607,581 | 8/1986 | Kopecky | 111/73 |
| 4,638,748 | 1/1987 | Kopecky | 111/7 |
| 4,674,419 | 6/1987 | Kopecky | 111/73 |
| 4,721,047 | 1/1988 | Stauch | 111/73 |

FOREIGN PATENT DOCUMENTS

| | | | |
|---|---|---|---|
| 153245 | 4/1952 | Australia | 111/73 |
| 255814 | 7/1967 | Australia | 111/85 |
| 1208878 | 10/1970 | United Kingdom | 111/190 |
| 2074432 | 11/1981 | United Kingdom | 111/7 |
| 2175185 | 11/1986 | United Kingdom | 111/85 |

Primary Examiner—Danton D. DeMille
Attorney, Agent, or Firm—Chernoff, Vilhauer, McClung & Stenzel

[57] ABSTRACT

A no-till drill mounts a seed distribution assembly on the upper portion of the back side of a chisel blade that cuts a furrow in the soil being planted. The seed distribution assembly includes a horizontal seed distribution plate having an upturned lip at its rear edge and side walls which extend upwardly from each of its sides. The side walls are joined to the blade at one of their ends and their other ends are separated from the upturned lip of the seed distribution plate. Thus, seed which is deposited onto the seed distribution plate from a seed supply tube falls off of the rear portion of the plate between the ends of the side walls and the upturned lip. The seed distribution assembly is wider than the blade and is positioned to extend partially into the furrow made by the blade and widen the upper portion of the furrow. Thus, the seed which falls off the sides of the seed distribution plate lands on ledges which are formed between the upper and lower portions of the furrow and remains separated from the fertilizer which is deposited at the bottom of the lower portion of the furrow by a fertilizer supply tube. A packer wheel, which follows each blade and drill, is pivotal about a vertical axis so that it remains parallel with the direction the blade and drill are traveling even when the device is being pulled across transversely sloping terrain which causes it to tail.

5 Claims, 2 Drawing Sheets

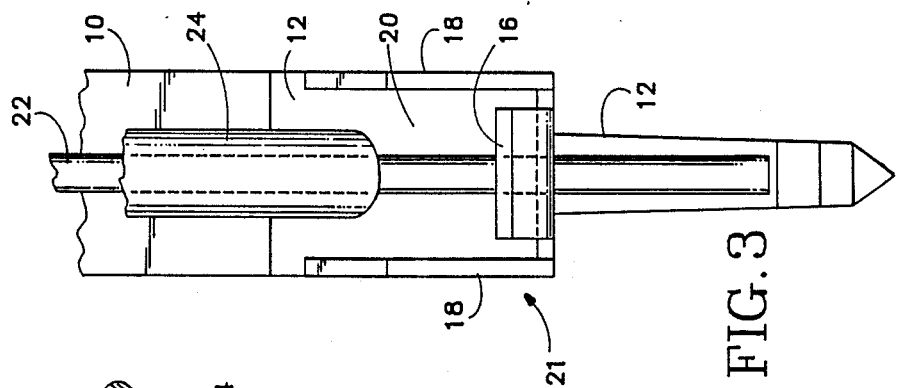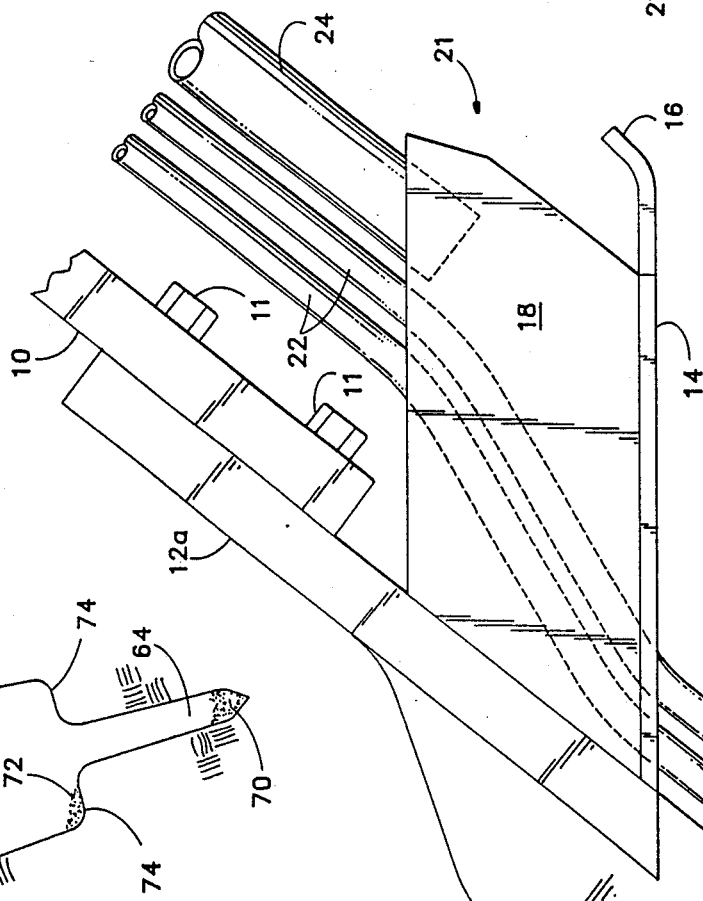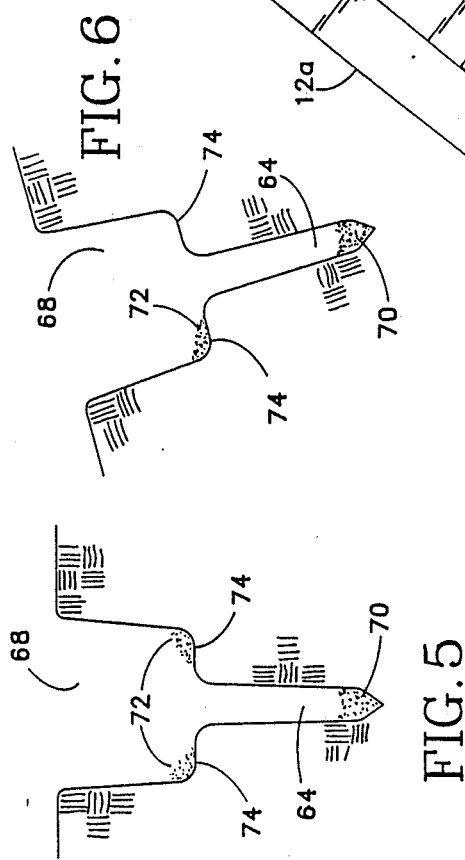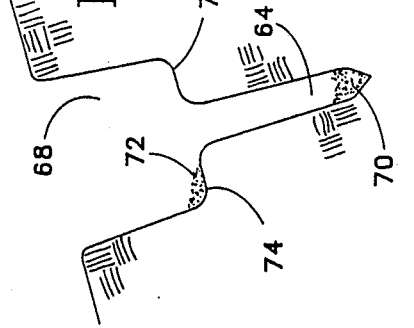

NO-TILL DRILL PROVIDING SEED AND FERTILIZER SEPARATION

BACKGROUND AND SUMMARY OF THE INVENTION

This invention relates to a no-till fertilizer and seed drill, and in particular to such a drill that ensures that the seed disbursed by the device is positioned a predetermined distance above the fertilizer disbursed by the device upon completion of the process.

No-till drills are commonly used to insert fertilizer and seed into the ground without having to turn the soil and thus destroy the compacting and surface root structure which prevents the soil from being blown away. The use of no-till drills is well known in the prior art. However, no-till drills have shortcomings which have not been completely overcome by the prior art, even though a concerted effort has been made to eliminate these shortcomings.

A first shortcoming of no-till drills relates to the inability to place the seed in the soil above the fertilizer and to maintain this separation after the soil is packed back over the seed and fertilizer. This separation is necessary to prevent seedlings which are produced from the seed from being burned by the fertilizer. A chronology of typical prior art attempts to overcome this shortcoming is set forth in a series of patents issued to Ivyl D. Kopecky. In Kopecky, U.S. Pat. No. 4,417,530, an attempt to create this separation is made by positioning the exit of the seed supply tube above and behind the exit of the fertilizer supply tube and then relying on soil falling on top of the fertilizer before the seed is deposited. This system depends a great deal on soil characteristics and is inconsistent at best. In Kopecky, U.S. Pat. No. 4,565,141 a sealer plate is placed between the fertilizer supply tube and the seed supply tube in order to manually cover the fertilizer with soil before the seed is deposited. While the use of a sealer plate provides more consistency than merely relying on the soil falling into place over the fertilizer, it also is inconsistent and depends on the makeup of the soil. Since the seed is deposited directly behind the fertilizer, a substantial portion of it drops into close proximity to the fertilizer irrespective of any packing which is accomplished by the sealer plate.

In Kopecky, U.S. Pat. Nos. 4,674,419 and 4,607,581 the sealer plate is refined to improve its packing efficiency and to form grooves on either side of the main furrow that is formed by the blade of the device. The seed tube also is divided into two portions which are angled outwardly from one another so that seed is deposited into the two grooves. Because the divided seed tube transversely separates the seed from the fertilizer, the device shown in Kopecky '419 and '581 does a good job of keeping the seed separated from the fertilizer when it is operated on flat terrain. However, when this device is operated on transversely sloping terrain the seed deposited from the seed tube on the uphill side falls directly behind the fertilizer and this separation is not maintained. The result is that the Kopecky '419 and '581 device is no more effective at maintaining fertilizer and seed separation on transversely sloping ground than are the earlier devices.

Another shortcoming of the prior art no-till seed and fertilizer drills also occurs when the devices are used on transversely sloping terrain. After the seed and fertilizer have been inserted into a furrow, the furrow is closed and compacted by a packer wheel which is pulled behind the drill assembly. Typically, several drill assemblies and packer wheels are carried side by side on a common wheeled frame and when such a device is used on transversely-sloped terrain it will tail or become cocked at an angle with respect to the direction of travel so that the downhill side of the frame is ahead of the uphill side. Since the packer wheels are mounted behind the frame and are rigidly connected to it, the packer wheels become offset from the furrows when tailing occurs. Thus, packing is not accomplished as well on transversely sloping terrain as it is on flat terrain.

The subject invention overcomes the first shortcoming of the prior art by mounting a seed distribution assembly behind the upper portion of a chisel blade which is used to create a furrow in the soil that is being planted. The seed distribution assembly includes a horizontal seed distribution plate having an upwardly turned lip at its rear edge and vertical side walls attached to each of its sides. The side walls extend from the blade rearwardly over less than the entire extent of the seed distribution plate, so as to create a closed ended trough between the blade, the seed distribution plate, and the side walls. The seed distribution assembly is wider than the blade and is located on the blade is such that it is partially in and partially out of the furrow created by the blade. As a result, the seed distribution assembly causes the upper portion of the furrow to be made wider than the lower portion.

The fertilizer supply tube extends below the bottom of the seed distribution assembly and thus causes the fertilizer to be deposited in the bottom of the furrow. The seed supply tube, on the other hand, exits into the trough which is located above the seed distribution plate. Seed therefore accumulates in the trough until the trough becomes partially full, and then flows off of the sides of the seed distribution plate between the lip at its end and the side walls. As a result the seed falls onto the ledges which are formed between the upper and lower portions of the furrow and, accordingly, remains separated from the fertilizer even when the furrow is closed by the packer wheel. When the device is used on transversely sloping ground the seed distribution plate becomes tilted and the seed only drops off of its downhill side where it falls onto the downhill ledge in the furrow. Thus, even on sloped terrain all of the seed remains separated from the fertilizer.

The second shortcoming is overcome by mounting the packer wheel on a bar which is rotatable relative to the shank which carries the blade and seed distribution assembly. This allows the packer wheel to rotate so that it remains parallel with the direction the device is being pulled even when the seed drills are angled downhill because a plurality of them are mounted on a common wheel frame which is traveling across transversely-sloped terrain. Since the furrows formed by the blades also are parallel with the direction the device is traveling the packer wheels remain centered on the furrows and completely cover and compact them.

Accordingly, it is a principal object of the present invention to provide a no-till seed and fertilizer drill which maintains a predetermined amount of separation between the fertilizer and the seed.

It is a further object to provide such a no-till drill which forms a furrow that is wider at its upper portion than at its lower portion and which deposits the seed on a ledge which is formed between the upper and lower portions of the furrow.

It is a still further object of the present invention to provide such a no-till drill which has a packer wheel that remains aligned with the furrow it is to pack even when the device travels across transversely sloping terrain.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 2 is a fragmentary side elevation view, at an enlarged scale, of the blade and the seed distribution assembly, which are elements of the subject invention.

FIG. 3 is a fragmentary end elevation view of the blade and seed distribution assembly shown in FIG. 2.

FIGS. 5 and 6 are schematic views showing the furrows made in soil by the no-till drill of the subject invention.

PREFERRED EMBODIMENT OF THE INVENTION

Figure 1:
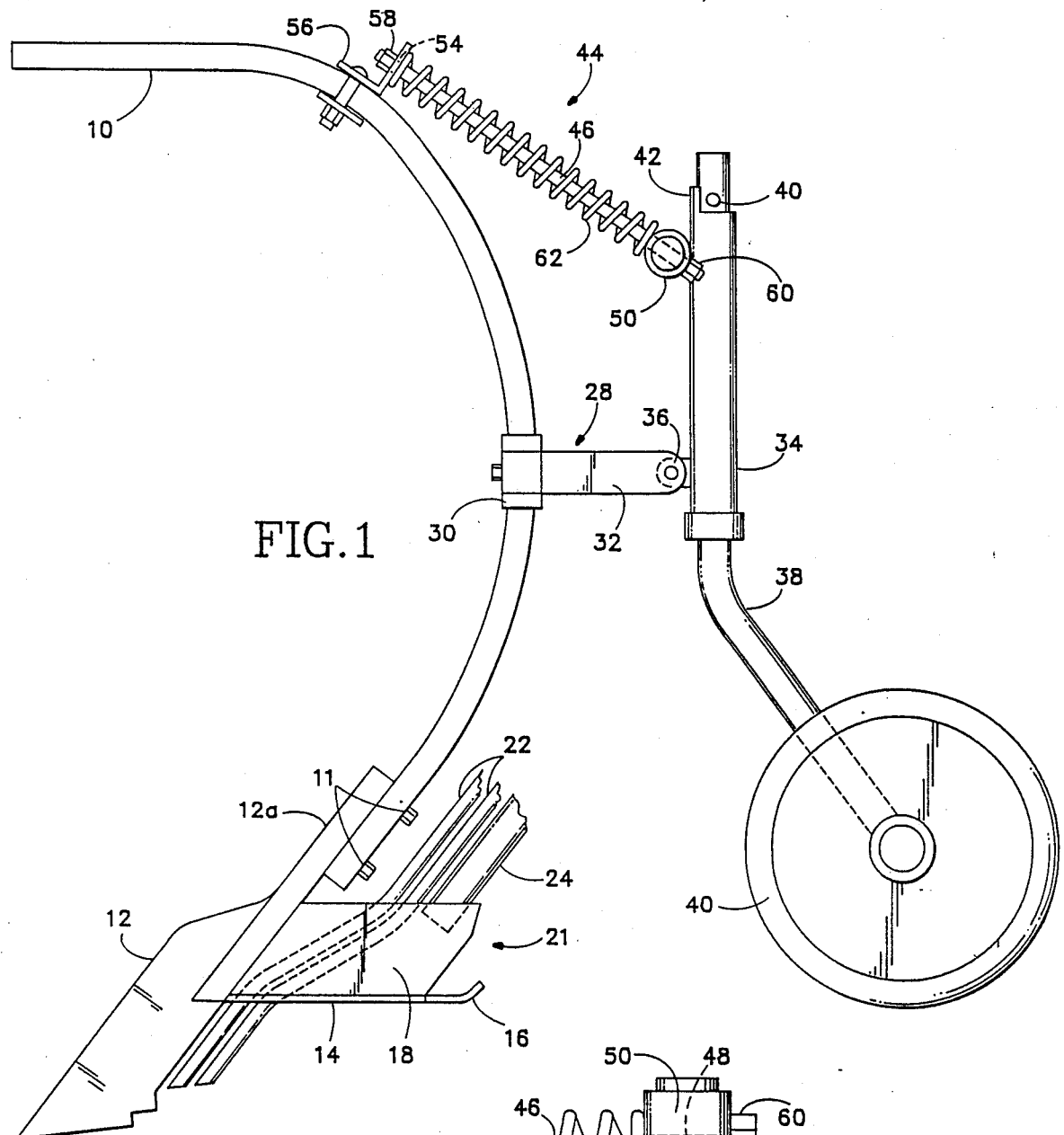
FIG. 1 is a side elevation view of a no-till seed and fertilizer drill which embody the features of the present invention.

Referring to FIG. 1 of the drawings, the no-till seed and fertilizer drill of the present invention comprises an arcuate shank 10 which carries the operative elements of the drill and is attachable to a frame (not shown) which supports a plurality of drills and fertilizer and seed supply tanks. Referring also to FIGS. 2 and 3, mounted on the bottom end of the shank 10, by means such as bolts 11, is a chisel blade 12 of the type which is commonly used on plows to create a thin furrow in the ground. Attached to the back side of the blade 12, approximately at its mid-point, is a seed distribution plate 14. The seed distribution plate is oriented so that it is generally horizontal when the device is in use, its rear portion is slightly narrower than the remainder of its extent, and it has an upturned lip 16 at its end. A pair of side walls 18 extend upwardly from joinder with the side margins of the plate 14 to form an enclosed trough 20 above the plate 14. The front edges of the side walls 18 are attached to the flange 12a of the blade 12 and the rear edges terminate where the plate 14 becomes narrower. Thus, the trough is enclosed on all sides but the top and the rear. The flange 12a of the blade 12 and the seed distribution assembly 21 comprised of the plate 14 and the side walls 18, is wider than the remainder of the blade. Thus, the upper portion of the furrow made by the device is wider than the lower portion.

A pair of fertilizer supply tubes 22, which extend through the seed distribution assembly 21 terminate proximate the lower end of the blade 12. The fertilizer supply tubes are connected to the fertilizer supply tank (not shown) which is carried on the frame that supports the drill and have flow control means (not shown), which are typical for devices of this type, placed in them. Located immediately behind the fertilizer supply tubes 22 is a seed supply tube 24 which empties into the trough 20. The seed supply tube is connected to a seed supply tank (not shown) which is carried on the frame and also has flow control means associated therewith.

Also mounted on the shank, near its mid-point, is a packer wheel assembly 26 which fills soil back over the furrow created by the blade 12 and seed distribution assembly 21 after seed and fertilizer have been inserted into the furrow. The packer wheel assembly includes a bracket 28 which attaches to the shank 10 through a clamp 30. A bar 32 extends rearwardly from the clamp and has a bushing 34 attached to it through a pivot joint 36, which permits the bushing to rotate freely relative to the shank about a horizontal axis. The bushing has a vertical opening extending through it which rotatably carries one end of a shaft 38, which has a packer wheel 40 rotatively attached to its other end. The shaft 38 is angled rearwardly as it extends downwardly below the bottom of the bushing 34 so that the packer wheel is offset rearwardly from the bushing when it is in its normal centered position. The upper end of the shaft 38 extends beyond the upper end of the bushing and a pin 40 protrudes outwardly from its sides. The upper end of the bushing 34 has a raised tab 42 which contacts the pin 40 when the shaft is rotated past a predetermined angle in either direction from its center position.

Figure 4:
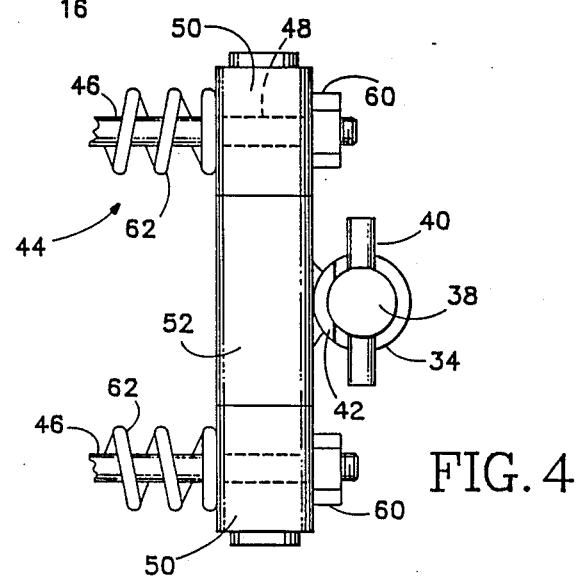
FIG. 4 is a fragmentary plan view, at an enlarged scale, taken along the line 4—4 of FIG. 1.

A damper 44, which connects the upper end of the bushing 34 to the shank 10, generally keeps the bushing in its normal vertical orientation and yet permits the bushing to rotate about the pivot joint 36 when the packer wheel 40 is urged upwardly as the device travels over irregular terrain. The damper is comprised of a pair of side-by-side rods 46. One of the ends of the rods 46 extend slidably through openings 48 in cylindrical blocks 50 which are rotatably joined to the ends of a bar 52 that in turn is attached to the upper end of the bushing 34. The other ends of the rods 46 extend slidably through openings 54 in a bracket 56 which is attached to the shank at a location which is above the location where the rods are attached to the bushing. Stops 58 located at the upper ends of the rods 46 prevent the rods from being pulled downwardly through the openings 54 in the bracket 56, and stops 60 located at the lower ends of the rods 46 prevent the rods from being pulled upwardly through the openings 48 in the cylindrical blocks 50. As can be seen in FIG. 4, the stops 58 and 60 are threaded onto the ends of the rods thereby permitting the distance between the stops to be adjusted in order to permit the angle of the bushing 34 to be varied. If it is necessary to make large adjustments to the angle of the bushing 34 which are beyond what can be obtained by adjusting the stops on the rods, the bracket 56 can be repositioned along the shank 10.

Extending between the bracket 56 and cylindrical blocks 50, around each of the rods 46, is a compression spring 62. The compression spring allows the bushing 34 to rotate about the pivot 36 in order to permit the packer wheel to be raised when it passes over high spots on the ground. However, the spring 62 provides resistance to the rotation of the bushing and continuously urges the packer wheel toward the ground so that it will cover the furrow made by the blade. Due to the curvature of the shank, once the packer wheel has been raised past a certain point the resistance against further raising becomes less, which protects the device when it travels over extremely undulating terrain.

In operation, the blade 12 forms a relatively thin furrow 64 as it is pulled across a field. Then as the seed distribution assembly 21 is pulled through the furrow it widens the upper portion 68, as shown in FIGS. 5 and 6. When the device is used on level ground, FIG. 5, fertilizer 70 is distributed through the fertilizer tubes 22 into the bottom of the furrow 64. Seed 72 which is deposited into the trough 20 falls off of both sides of the plate 14 behind the side walls 18 and drops on both sides of the ledge 74 that is formed between the upper and lower portions of the furrow, where it remains separated from the fertilizer 70.

When the device is used on sloped ground, on the other hand, the seed only falls off of the lower side of the plate 14 and is deposited on the ledge 74 on the downhill side of the upper portion 68 of the furrow, FIG. 6. In either event, when the packer wheel is pulled over the furrow to close it, the seed remains above the fertilizer in the soil so that it will not be burned when it sprouts.

When the apparatus of the present invention is pulled across flat terrain the packer wheel remains centered in the bushing and thus is located above the furrow as it would if it were not rotatable about a vertical axis. When the device is used on transversely sloping terrain, however, the frame that carries the device will tail or become cocked at an angle with respect to the direction of travel. When this occurs rather than remaining centered, and thus being offset from the furrow, the shaft 38 will rotate in the bushing 34 and the packer wheel 40 will remain on top of the furrow so that complete packing can be achieved.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A seed and fertilizer drill comprising:
   (a) blade means for making a furrow when the drill is pulled across the field;
   (b) fertilizer supply tube means positioned adjacent to said blade means for placing fertilizer in the furrow formed by said blade means, proximate the bottom thereof;
   (c) seed distribution means associated with said blade means for widening the upper portion of the furrow formed by said blade means above the portion thereof which contains the fertilizer, and for placing seed in the widened furrow portion created thereby in a manner such that it is above the fertilizer and separated therefrom, said seed distribution means including:
      (i) a rectangular plate which extends rearwardly from attachment to said blade means and is oriented generally horizontally when the drill is in its operative position;
      (ii) said plate having an upturned lip on the end thereof which is opposite the end which is attached to said blade means;
      (iii) spaced-apart upstanding side walls which are joined to said plate along the opposed side margins thereof, said side walls extending from joinder with said blade means rearwardly over less than the entire extent of said plate;
      (iv) seed supply tube means for placing seed onto said plate between said side walls; and
   (d) a packer wheel which is located behind said blade means and said seed distribution means and closes the furrow formed thereby.

2. The drill of claim 1 wherein said blade means comprises a chisel blade.

3. The drill of claim 1 including a shank which carries said packer wheel, and coupling means for permitting said packer wheel to rotate relative to said shank about both horizontal and vertical axes.

4. The drill of claim 3 wherein said coupling means includes stop means for limiting the amount of rotation of said packer wheel about the vertical axis.

5. The drill of claim 3 wherein said coupling means includes restraining means for supplying an opposing force which restrains the rotation of said packer wheel about the horizontal axis.

* * * * *